Aug. 22, 1939.  F. D. WENN  2,170,511
FRICTIONAL BRAKE LEVER
Filed Feb. 27, 1939  2 Sheets-Sheet 1

Inventor:
Floyd D. Wenn
Louis Illmer
Attorney

Aug. 22, 1939.    F. D. WENN    2,170,511
FRICTIONAL BRAKE LEVER
Filed Feb. 27, 1939    2 Sheets-Sheet 2
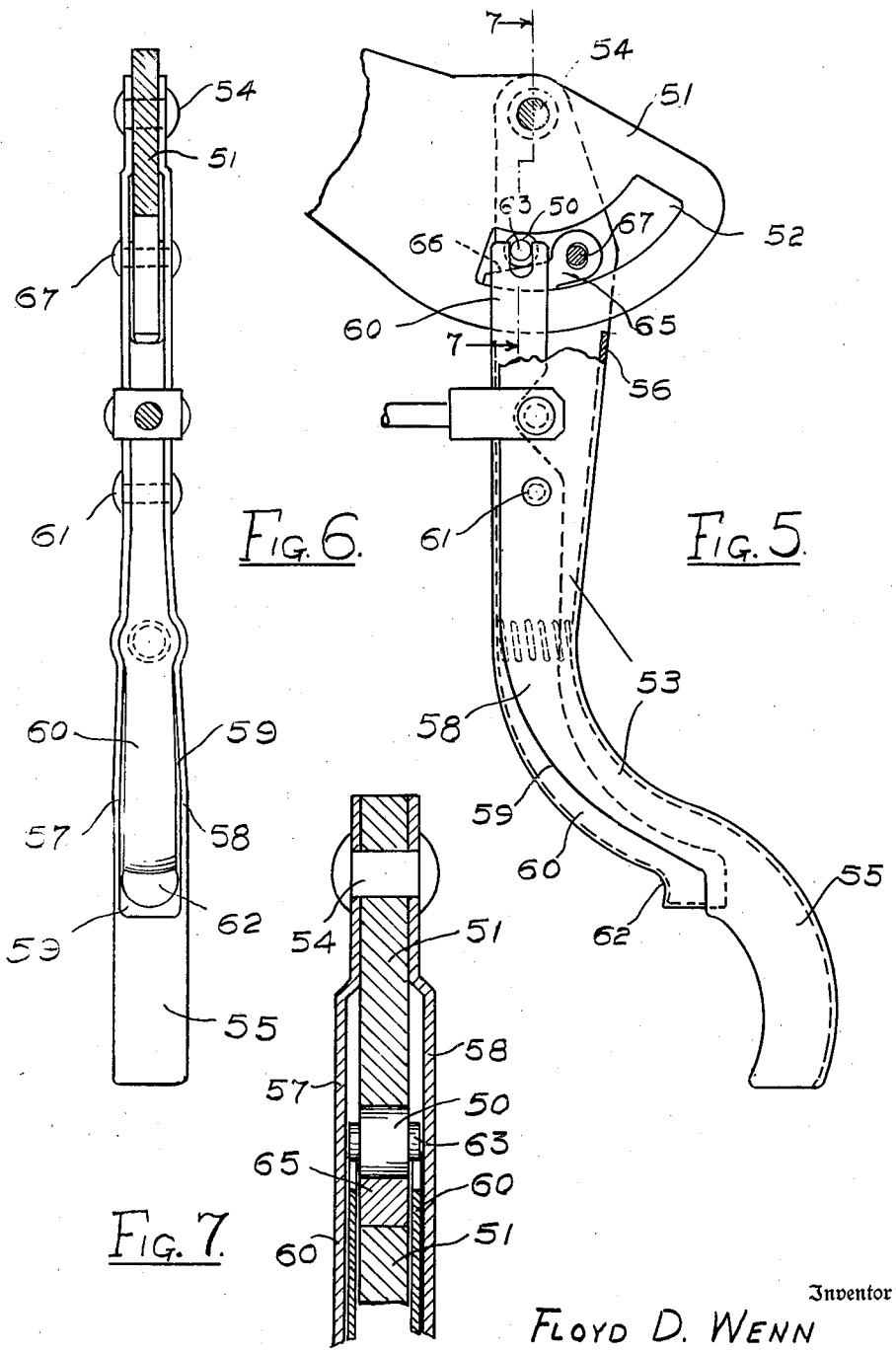
Inventor:
FLOYD D. WENN
Louis Illmer
Attorney Patented Aug. 22, 1939

2,170,511

UNITED STATES PATENT OFFICE 2,170,511

FRICTIONAL BRAKE LEVER

Floyd D. Wenn, Binghamton, N. Y., assignor to The Brewer-Titchener Corporation, Cortland, N. Y., a corporation of New York Application February 27, 1939, Serial No. 258,711

5 Claims. (Cl. 74—531)

This invention relates to a novel emergency lever assembly or the like manipulative control of the two-part clutch pattern for releasably setting up automotive vehicle brakes, and is more particularly directed to improved lever detent devices of the heavy duty frictional type comprising a wedge shoe part shiftably mounted within the confines of opposed groove walls preferably arranged in a stationary sector plate and which walls are concentrically disposed about the axis of the main fulcrum of a swingable primary lever. Said shoe shiftably rides along one such groove wall in unison with the lever movements. A manipulative spring actuated clutch block or controllable follower detent part is made to ride cooperatively along the opposite groove wall. These mated clutch parts are respectively provided with an interposed wedge plane inclined to automatically thrust said shoe and its block into tight frictional engagement with their respective contiguous groove walls when the brake lever is set, my actuated clutch block part being independently shiftable with respect to the shoe part along said plane.

Such inherent self-locking wedge embodiment is herein attained in combination with a definite double-acting grip of sufficient magnitude to properly meet brake lever locking needs and the resulting wedge grip may easily be released at will by a relative manipulative shift of the separable clutch parts along the interposed inclined plane thereof. When lockingly engaged, the accompanying wedge effect is wholly confined within the sector groove and not allowed to impose a reacting thrust upon the main lever fulcrum. Both of my balanced dual groove contacting areas are collectively located radially away from said fulcrum to doubly fortify the set lever against unwanted slip.

The disengagement of my wedged clutch parts may be remotely controlled from the handle region of the primary lever through a maninpulative auxiliary trip lever. Such lever may be pivoted to the primary lever and operatively connected to manually release the clutch block with respect to the inclined shoe plane. Each such clutch part affords an assured generous load carrying area without suffering from excessive wear and tear under arduous service. When set, my clutch parts remain safely engaged and are not likely to be inadvertently knocked loose or become accidentally disengaged by jarring or the like contingencies. Accordingly, my engaged clutch block does not need to be equipped with supplementary detent locking devices such as are disclosed in my prior Patent No. 2,127,097 dated August 16, 1938, and in which a tiltable locking washer is made to frictionally grip a cylindrical rod surface.

The object of the present improvements thereover is to contrive an inherently reliable manipulative brake lever assembly of the indicated character adapted to be set in any lever position and capable of being effectively incorporated into automotive equipment on a low-cost productive basis.

Reference is had to the accompanying two sheets of drawings which are illustrative of alternative embodiments of my clutch devices, and in which:

Fig. 1 is an elevational side view of a depending suspended type of brake lever equipped with my improved frictional detent, the clutch block mechanism being in part exposed and the lever standing in its off position, while

Fig. 5 depicts a side view of a modified lever assembly, and Fig. 6 represents an edge view thereof.

Fig. 7 is an enlarged sectional detail taken along line 7—7 of Fig. 5.

Figure 1:
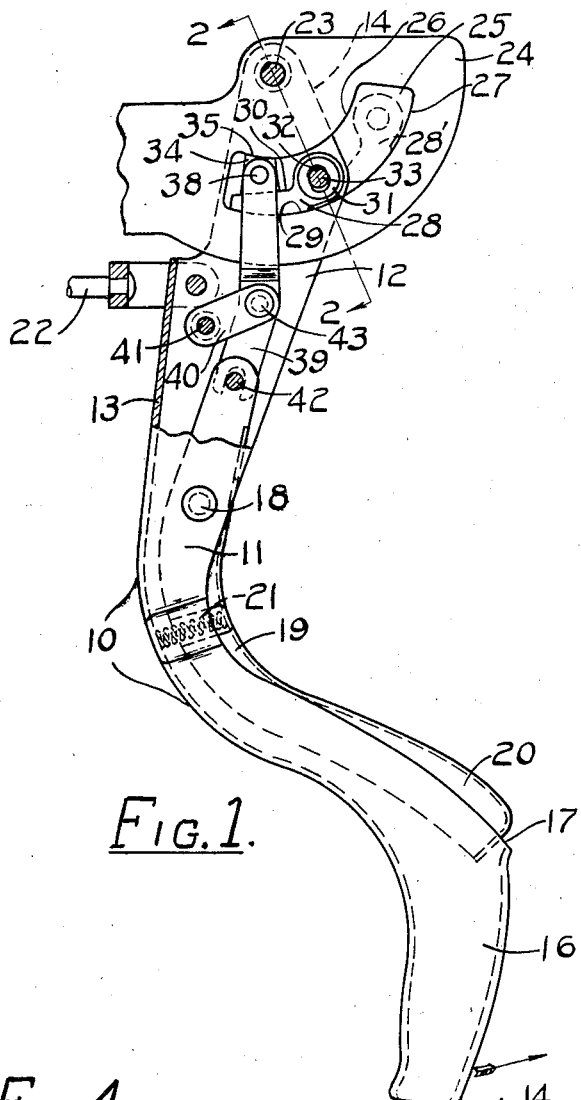
Figure 2:
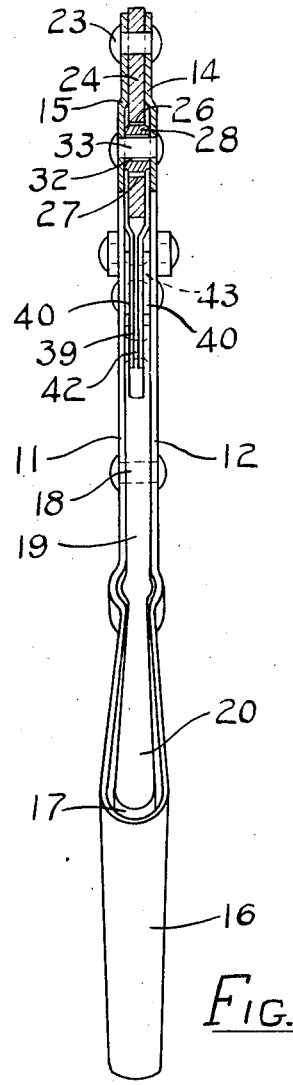
Fig. 2 represents a partially sectionalized edge view thereof taken along line 2—2 of Fig. 1.

Referring first to the Figs. 1 to 4 exemplification, such assembly preferably comprises an S-shaped primary sheet metal brake lever 10 having a channeled cross-sectional profile to include the opposed side flanges 11 and 12 that may be closely spaced apart in parallelism and interconnected by the integral web 13. The upper pivoted end of my suspended lever may be bifurcated to constitute forks 14 and 15 that are spaced in substantial biplanar relation. The depending lower lever end may terminate in a perimetrically closed piston grip 16, as shown.

Intermediate this grip and said forks, the lever edge facing the driver may be shaped to provide for an open edge mouth or web gap 17. Mounted therein on the intermediate pivot 18, is a trip or the like auxiliary clutch releasing lever 19 of which one end may be associated with the grip 16 as a manipulative thumb piece 20. An interposed return spring 21 serves to thrust the thumb piece into its normal Fig. 1 position and as will appear presently, this same spring may be utilized to automatically shift my clutch block in relation to its cooperating wedge shoe. The pivoted brake rod or cable 22 is intended to connect the primary lever with a brake drum in a conventional manner.

The outer fork ends of the primary lever may be apertured for the reception of the main fulcrum pin 23 that is pivotally mounted through a stationary metallic sector plate 24 of sheet metal. Said lever may be swingably installed behind the instrument board of an automotive vehicle (not shown). My plate 24 may have an elongated slot or sector groove 25 formed in or cut therethrough of which the opposed circular concave and convex side walls 26 and 27 may be smoothly hardened and concentrically arranged about the fulcrum axis.

The present two-part frictional clutch components are wholly mounted within the wall confines of said groove or the equivalent recess and may comprise a flat sided wedge shoe 28 of hardened metal having a seated arcuate face 29 that slidably bears upon one of the groove side walls such as 27. Said shoe contour also embraces an opposed planiform wedging face 30 whose inclination is divergently disposed with respect to said seated shoe face. The thicker end of said shoe may terminate in a rounded head portion 31 having a transverse aperture 32 through which is loosely entered the drag pin 33. This pin bridgingly spans the primary lever forks and is sufficiently cleared by the aperture 32 to allow the shoe face 29 to unrestrictedly seat upon the groove wall 27 into gripping contact therewith. A cooperating clutch block 34 or equivalent detent means may be provided with an inclined surface that is retractibly borne lengthwise of the mated shoe face 30. The opposed seat face 35 of said block is here given a concaved shape to conform with the other groove wall 26, as shown. If desired, the shoe and block may be reversely disposed with respect to the opposed groove walls.

Figures 3, 4:
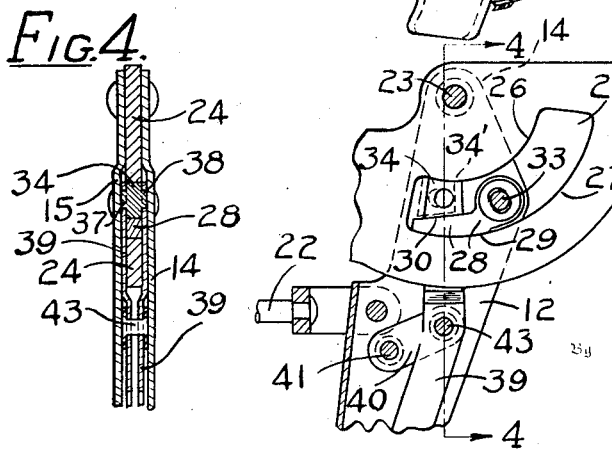
Fig. 3 shows a fragmental side view portion corresponding to that of Fig. 1.
Fig. 4 is a cross-sectional view taken along line 4—4 of Fig. 3.

The respective side faces of such clutch block may be equipped with an overhanging integral trunnion 37 or 38 extending beyond the respective side faces of the sector plate in the Fig. 4 manner. Duplex block actuating arms such as 39 may be pivotally guided intermediate their ends at 43 by the mated links 40 mounted to turn upon the flange pivot 41. Corresponding ends of such reversing rocker arms are pivoted to the respective trunnions (see Fig. 4) so as to evenly guide my shiftable detent 34 into place. The offset opposite arm ends may be bifurcated to provide for a slip joint with respect to the trip lever actuating pin 42. All the described clutch mechanism is compactly embraced within the narrowly spaced lever side flanges 11 and 12. It will be apparent that by virtue of the flange pins 18, 33 and 41, both the block and its shoe will be shifted in unison with the lever movements.

The mode of operation of the present lever is inherently simple and its principal structural components adapted to be economically fabricated by stamping methods. In Fig. 1, the suspended primary lever stands in released position and its associated brake may be set by drawing the grip 16 in its arrowed direction. The brake rod 22 becomes fully tensioned when the shoe is drawn into its dotted position 28' (see Fig. 1). Except when the thumb piece 20 is manually depressed, the spring 21 actively urges the clutch block 34 toward the diverging region of the wedge surface 30, the latter being inclined to forcibly thrust said block and the convex shoe face 29 into tight gripping relation with their respective groove walls 26 and 27. My clutch device comprises but two self-locking parts arranged to automatically lock a brake lever in ratchet fashion. The primary lever 10 remains free to shift in the arrowed direction for the reason that the detent 34 will be shifted toward its released dotted position 34' (see Fig. 3). Assuming the thumb piece is not held depressed, then instantly upon releasing said lever after being swung into its set brake position, the spring 21 bodily shifts the block 34 toward the aforesaid divergent region of the wedge plane and thereby automatically checks a desired brake lever setting without appreciable slip back.

To release such brake, the thumb piece 20 is deliberately actuated against spring tension, thus causing the detent block to be bodily shifted relative to the wedge shoe toward its dotted position 34' wherein both such clutch parts no longer grip the groove walls. Because of a relatively small degree of convergency given to the inclined wedge face 30, the actuated trip lever may easily move such detent lengthwise of the sector slot notwithstanding that both slot walls 26 and 27 are still being gripped. It will be obvious that the return spring 21 or its equivalent need not be incorporated within the lever confines but if preferred, may be more directly associated with the retractible detent.

My internally balanced clutch mechanism is self-contained and when locked, the resulting wedge thrust does not react upon the main fulcrum 33 or the lever forks. All wedging action is confined within the groove walls to obviate lever cocking effects and such wear as may occur on part of the separable wedging members, is compensated by a slightly altered locking position along the wedge face 30. Furthermore, the fact that my clutch parts are of the dual thrust type, correspondingly augments the frictional hold and assures a safely locked brake adapted to be set in any position without dependence upon stepwise ratchet teeth.

Referring now to Figs. 5 to 7, these show a brake lever assembly identical in principle with that previously described, except that trunnioned roller 50 replaces a corresponding square sided block such as 34. The lever handle and trip lever assembly has also been rearranged.

In such layout, the stationary sector plate 51 is slotted at 52 and the forked end of a primary sheet metal lever 53 is suspended on the main fulcrum 54. The other lever end may be provided with a modified style of piston grip 55 and the lever web 56 interconnects the flanges 57 and 58 to provide for a reversely disposed edge mouth 59. Inset into such mouth is a spring actuated trip lever 60 fulcrumed intermediate its ends to the flange pivot 61. The lower trip lever end may be shaped to provide a triggerlike finger piece 62 and its other end may be bifurcated for direct slip connection to the opposed clutch block trunnions such as 63. Said trunnions are preferably carried coaxially by the cylindrical or rollershaped clutch block 50 adapted to be retractibly wedged into locked clutch position, in a manner substantially identical to the corresponding square block 34. In this instance, such rollerlike surface is kept to a uniform diametral size adapted to be turned about the aligned trunnion axes to present a different contact region between converging inclined wedge planes.

The cooperating clutch shoe 65 and its wedge face 66 may be shaped like the corresponding element in Fig. 1. If preferred, such wedge face may be reversely mounted and made to thrust against the convexed groove wall. It will be evident from the foregoing functional description that when the trigger 62 is manually depressed toward its associated pistol grip, the clutch block 50 will be retracted away from the retained drag pin 67 and thereby release the set clutch devices. When my lever is operatively set, the resulting clutch grip can be made virtually as secure as that obtained by the use of conventional stepwise ratchet teeth.

As will be understood by those skilled in this art, my improvements also find application to other than emergency brake lever uses and that various changes in the structural details and disposition thereof may be resorted to in likewise carrying out the illustrative embodiment of my lever clutch devices, all without departing from the spirit and scope of my invention heretofore described and more particularly pointed out in the appended claims.

I claim:

1. A primary lever swingably pivoted upon a main fulcrum, grooved sector plate means having a pair of spaced groove side walls concentrically disposed about the fulcrum axis, two-part clutch means mounted between said walls to comprise a shoe part provided with opposed divergent faces of which one such face is slidably seated upon one of said groove walls and the other shoe face is shaped to constitute an inclined wedge plane and the mated part of which clutch comprises detent means retractibly interposed between said wedge plane and the other groove wall, drag pin means for the primary lever disposed in operative engagement with said shoe part to alter the seated position of the last named part in unison with the lever movement, resilient means urging said detent means toward the divergent region of said wedge plane whereby to normally thrust both clutch parts into frictional grip with their respective contiguous groove walls, and manipulative clutch releasing lever means pivotally carried by the primary lever and operatively connected to independently shift the detent means along its contiguous groove wall lengthwise away from the divergent region of said wedge plane and counter to the urge of the resilient means into a displaced relationship to the seated shoe part.

2. A primary lever swingably pivoted upon a main fulcrum, grooved stationary sector plate means having a pair of spaced groove side walls concentrically disposed about the fulcrum axis, two-part clutch means mounted between said wall confines to comprise a shoe part provided with opposed divergent faces of which one such face is slidably seated upon one of said groove walls and the other shoe face is shaped to constitute an inclined wedge plane and the mated part of which clutch comprises flat sided block means retractibly interposed between said wedge plane and the other groove wall, the respective side faces of the detent means each being provided with a trunnion, drag pin means for the primary lever disposed in operative engagement with said shoe part to alter the seated position of the last named part in unison with the lever movement, resilient means automatically urging said block means toward the divergent region of said wedge plane whereby to normally thrust both clutch parts into a self-locking frictional grip with their respective contiguous groove walls, and manipulative clutch releasing lever means pivotally carried by the primary lever and linked to said trunnions to independently shift said block means lengthwise of its contiguous groove wall into a retracted block position and thereby liberate the aforesaid grip.

3. A primary lever swingably pivoted upon a main fulcrum, grooved stationary sector plate means having a pair of spaced groove side walls concentrically disposed about the fulcrum axis, two-part clutch means assembled between said walls to comprise a shoe part including opposed divergent faces of which one such face is slidably seated upon one of the groove walls and the other shoe face is shaped to constitute an inclined wedge plane and the mated part of which clutch comprises roller means retractibly interposed between said wedge plane and the other groove wall to serve as detent means, the respective ends of such roller means each being provided with a coaxial trunnion, drag pin means for the primary lever disposed in operative engagement with said shoe part to alter the seated position of the last named part in unison with the lever movement, resileint means automatically urging said roller means toward the divergent region of said wedge plane and thereby bringing both the clutch parts into a self-locking frictional grip with their respective contiguous groove walls, and manipulative auxiliary lever means pivotally carried by the primary lever and operatively connected to independently shift the roller means lengthwise of its contiguous groove wall into a retracted roller position when the aforesaid grip is liberated.

4. An automotive emergency lever assembly including a stamped primary lever of sheet metal comprising a pair of laterally spaced side flanges of which a marginal portion is web interconnected, one end of said lever being provided with a pistol grip and the other end being forked in spaced biplanar relation, said web interconnection having a gap located adjacent to said grip, a grooved stationary sector plate provided with a pair of spaced groove side walls concentrically disposed about an axis, a main fulcrum entered through said forks and the sector plate in substantial coincidence with said axis, a two-part clutch mounted between said wall confines to comprise a shoe part including opposed divergent faces of which one such face is slidably seated upon one of the groove walls and the other shoe face is inclined to constitute a wedge plane and the mated part of which clutch comprises detent means retractibly interposed between said wedge plane and the other groove wall, a drag pin operatively interconnecting the primary lever with said shoe, spring means urging said detent means toward the divergent region of said wedge plane to automatically bring both clutch parts into frictional grip with their respective contiguous groove walls, and a manipulative trip lever interposed within the aforesaid side flanges and pivoted thereto between the trip lever ends, one trip lever end protruding through the web gap and its other end being operatively connected to retract the detent means against the urge of said spring means.

5. A primary lever swingably pivoted upon a main fulcrum, a grooved sector plate having a pair of spaced groove side walls concentrically disposed about the fulcrum axis, self-contained two-part clutch means mounted between said walls to comprise a shoe part provided with opposed divergent faces of which one such face is slidably seated upon one of said groove walls and the other shoe face is inclined to constitute a wedge plane, the divergent region of said shoe having a pin receiving aperture therethrough, and the mated part of which clutch comprises detent means retractibly mounted between said wedge plane and the other groove wall, a drag pin carried by the primary lever and operatively entered into the shoe aperture, spring means urging said detent means toward the divergent region of said wedge plane to automatically bring both clutch parts into frictional grip with their respective groove walls, and clutch releasing means carried by the primary lever and serving to independently shift said mated detent part with respect to the shoe part lengthwise of the interposed wedge plane toward the converging region thereof.

FLOYD D. WENN.